United States Patent [19]
Nishina

[11] Patent Number: 5,657,121
[45] Date of Patent: Aug. 12, 1997

[54] SPECTRUM MEASURING DEVICE ELIMINATING POLARIZATION DEPENDENCY

[75] Inventor: Shigeki Nishina, Gyoda, Japan

[73] Assignee: Advantest Corporation, Tokyo, Japan

[21] Appl. No.: 543,277

[22] Filed: Oct. 16, 1995

[30] Foreign Application Priority Data

Oct. 19, 1994 [JP] Japan .................................. 6-280071

[51] Int. Cl.$^6$ .................................. G01J 3/18; G01J 3/32
[52] U.S. Cl. .................. 356/327; 356/328; 356/334
[58] Field of Search ................ 356/319, 322–323, 356/325–328, 329, 330, 334, 364, 365; 359/497, 501

[56] References Cited

U.S. PATENT DOCUMENTS

| | | | |
|---|---|---|---|
| 2,718,170 | 9/1955 | Lyot | 359/497 |
| 4,995,724 | 2/1991 | Sonobe et al. | 356/319 |
| 5,080,486 | 1/1992 | Shirasaki et al. | 356/328 |

*Primary Examiner*—K. Hantis
*Attorney, Agent, or Firm*—Knobbe, Martens, Olson & Bear, LLP

[57] ABSTRACT

A spectrum measuring device for measuring optical spectrum of input light includes first and second double-image elements which separate input light to be measured into two polarized wave components having respective planes of polarization perpendicularly intersecting each other and having different optical axes, a third double-image element which separates the two polarized wave components from the first and second double-image elements into four polarized wave components each two of which having respective planes of polarization perpendicularly intersecting each other and having different optical axes, a dispersing element which is irradiated by the four polarized wave components from the third double-image element in which the dispersing element separates optical components of each wavelength contained in the four polarized wave components at the same angle of separation, and a photodetector for measuring an overall intensity of the four polarized wave components of the same wavelength separated by the dispersing element.

7 Claims, 4 Drawing Sheets

SPECTRUM MEASURING DEVICE ELIMINATING POLARIZATION DEPENDENCY

BACKGROUND OF THE INVENTION

The present invention relates to an optical system for measuring spectrum of an incoming light signal having unknown conditions of polarization, and more particularly, to a spectrum measuring device which is capable of removing a polarization dependency and a requirement of precise positional arrangement between the optical components by additionally including a double-image element so that limitations of measurement accuracy and stability, derived from inaccuracies in positioning optical components such as a diffraction grating and conventional two double-image elements, are obviated.

A spectrum measuring device for measuring optical spectrum in a light signal generally includes a prism and a diffraction grating whereby light to be measured is split into wave component, i.e., optical spectrum, of respective wavelengths. An assignee of this application owns U.S. Pat. No. 5,080,486 in which a spectrum measuring equipment is provided with two double-image polarizing elements to eliminate a polarization dependency in the measuring equipment. The present invention further improves the elimination of the polarization dependency and obviates the accurate positioning of the optical components in the spectrum measuring device.

Figure 4:
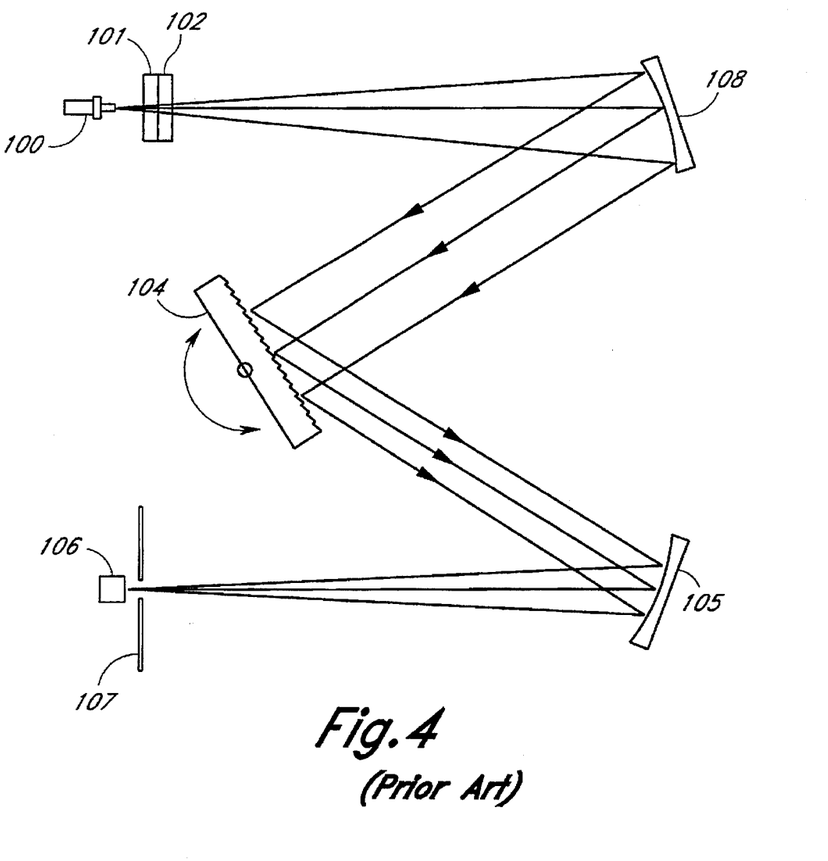
FIG. 4 shows a structure of a conventional spectrum measuring device having two double-image elements.

An example of conventional spectrum measuring device disclosed in the U.S. Pat. No. 5,080,486 is summarized below with reference to FIGS. 4, 5 and 6. As shown in FIG. 4, the conventional spectrum measuring device includes an optical connecter 100, double-image elements 101 and 102, a collimate mirror 108, a dispersing element 104 such as a diffraction grating, a convergence mirror 105, a slit 107 and a photodetector 106.

When light to be measured is incident to the dispersing element 104 which is typically a diffraction grating, light waves of wavelengths $\lambda_1$ and $\lambda_2$, for example, contained in the light are dispersed and reflected in the direction having the angles of $\theta_1$ and $\theta_2$ dependent upon the wavelengths $\lambda_1$ and $\lambda_2$. The quantities (intensity) of light of the wavelengths $\lambda_1$ and $\lambda_2$ are measured by the photodetector 106 and expressed ultimately as spectrum of the incident light.

It is known in the art that a dispersing element such as a diffraction grating has a disadvantage in that when the light to be measured incident thereto is polarized, the diffraction efficiency varies with the angle of plane of polarization, causing a change in the quantities of light of the wavelengths $\lambda_1$ and $\lambda_2$ to be dispersed or separated. This phenomenon is commonly referred to as a polarization dependency of the dispersing element.

Therefore, it is necessary to include means for eliminating the polarization dependency of the diffraction grating in the spectrum measuring device to prevent the change of diffraction efficiency when receiving light to be measured has unknown polarization. In the example of FIG. 4, the double-image elements 101 and 102 are employed for such a purpose of removing the polarization dependency. The double-image elements 101 and 102 have a function of separating the incident light into two beams having different optical axes, as well as the function of splitting the light into two polarized wave components.

Each of the double-image elements 101 and 102 is formed of a plate made of a uniaxial crystal material such as calcite which has the same thickness with each other. The double-image elements 101 and 102, typically Savart plates, are cut obliquely to their crystal axes and are attached together with their principal sections turned 90 degrees apart. As is known in the art, each of the double-image elements is capable of separating the incident light into an ordinary ray and an extraordinary ray. By using the two double-image elements 101 and 102 in combination, the spectrum measuring device can remove the polarization dependency and thus the diffraction efficiency remains constant without regard to the polarization of the incoming light to be measured.

Figure 5:
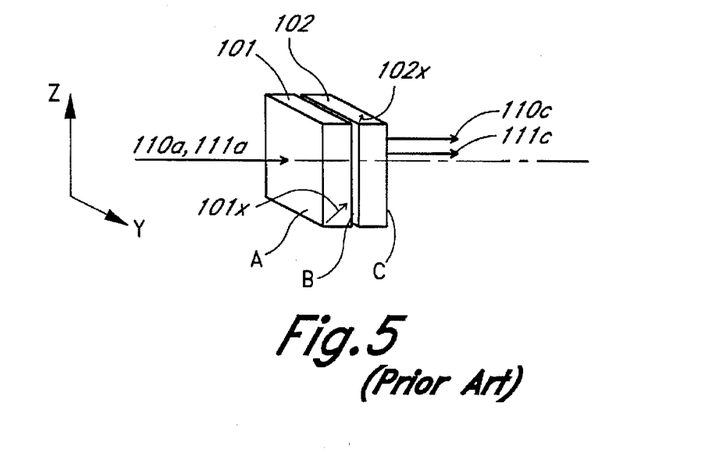
FIG. 5 is a schematic view showing a positional relationship between the two double-image elements in the conventional spectrum measuring device of FIG. 4.

The more details of positional relationship between the double-image elements and changes of optical conditions in this arrangement are explained. As shown in FIG. 5, the double-image element 101 is cut obliquely to the crystal axis direction 101x in such a way that an extraordinary ray will be refracted in a Z-direction. The double-image element 102 is cut obliquely to the crystal axis direction 102x in such a way that an extraordinary ray will be refracted in a Y-direction. As a result, the double-image elements 101 and 102 are arranged in a manner that the same two calcite plates are stacked in their crystal axis 90 degrees apart one another.

Light to be measured which is supplied from the optical connector 100 has polarized wave components 110a and 111a which incident perpendicularly to a surface A of the double-image element 101. The components 110a and 111a pass through the double-image element 101 while separated into two beams and incident to a surface B of the double-image element 102. After passing through the double-image element 102, two polarized wave components 110c and 111c are emitted from a surface C of the double-image element 102.

Figures 6A, 6B, 6C:
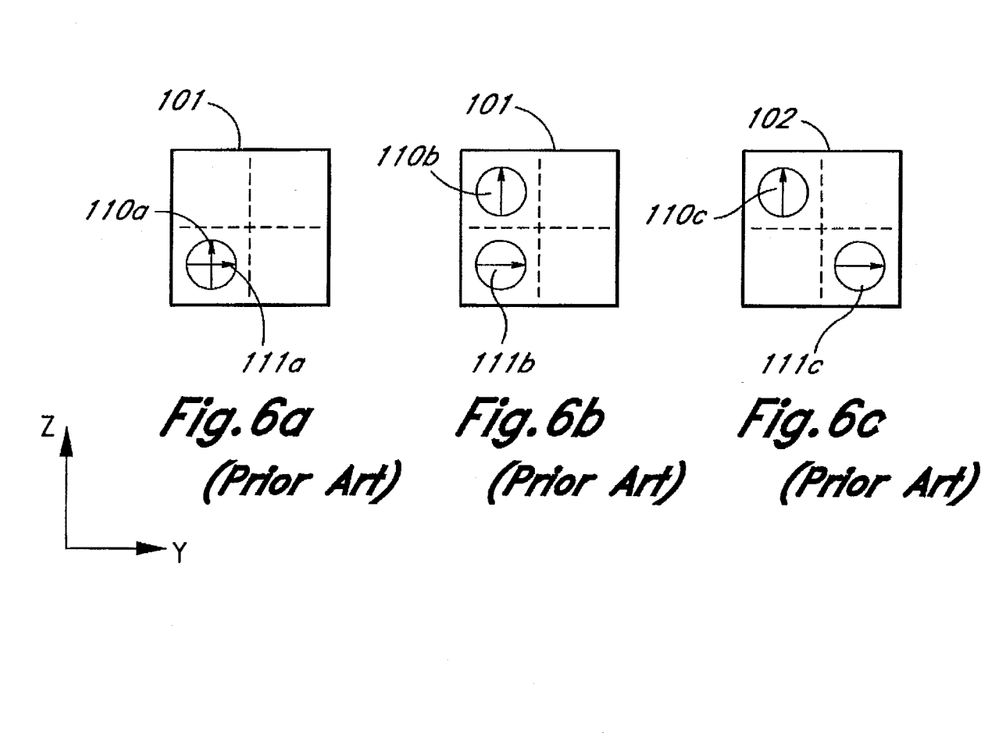
FIG. 6(a) is an optical diagram showing orthogonal polarization components in the light projected to a surface A of the double-image element 101.
FIG. 6(b) is an optical diagram showing the polarization components incident to the double-image element 102.
FIG. 6(c) is an optical diagram showing the polarization components emitted from the double-image element 102.

More particularly, for the light projected in the surface A, it is assumed that polarized wave components 110a and 111a which are perpendicular with each other are projected to the position shown in FIG. 6(a) of the double-image element 101. In the double-image element 101, an extraordinary ray is refracted to the Z-direction so that the polarized wave component 110a is laterally displaced while the polarized wave component 111a advances directly. Thus, as shown in FIG. 6(b), a polarized wave component 110b which is originated from the component 110a and a polarized wave component 111b which is originated from the polarized wave component 111a are projected to the surface B of the double-image element 102.

In the double-image element 102, the polarized wave component 110b advances directly while an extraordinary ray is refracted to the Y-direction so that the polarized wave component 111b is laterally displaced. Thus, as shown in FIG. 6(c), a polarized wave component 110c which is originated from the polarized wave 110b and a polarized wave component 111c which is originated from the polarized wave component 111b are emitted from the surface C of the double-image element 102. Traveling distances for these wave components in the double-image elements 101 and 102 are identical since the double-image elements 101 and 102 are made of parallel surfaces having the same thickness.

Figure 6D:
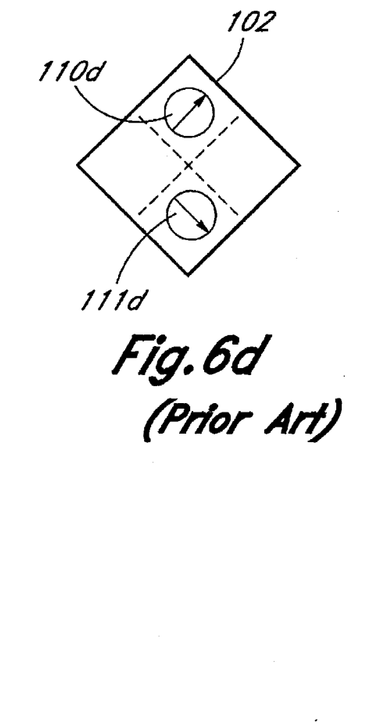
FIG. 6(d) is an optical diagram showing the polarization components emitted from the double-image element 102 where the double-image elements 101 and 102 are turned by 45 degrees from the state of FIG. 6(c).

The above explanation presupposed that both of the double-image elements are arranged horizontally. However, in an actual spectrum measuring device, it is arranged so that the double-image elements 101 and 102 turn 45 degrees from the state shown in FIG. 6(c), hence the polarized components 110d and 111d are displaced as shown in FIG. 6(d). In this situation, the two separated beams 110d and 111d are obtained which have parallel optical axes and have planes of polarization at ±45 degrees with respect to the vertical axis Z, respectively.

Projecting each of the two beams having the planes of polarization ±45 degrees apart or perpendicular intersecting each other to the diffraction grating 104 means that a half of amplitude level is given to the diffraction grating 104 by each polarized wave component, which enables spectrum analysis which is not subject to the diffraction efficiency based on polarization. Hence, the sum of the intensities of the two polarized beams is detected as an electric signal by the photodetector 106 without being affected by the polarization condition of the light to be measured from the optical connecter 106.

In the arrangement of FIG. 4, the collimate mirror 108 receives light beams from the optical connector 100 via the double-image elements 101 and 102. The collimate mirror 108 then transforms the light beams into parallel light beams and project them to the dispersing element 104.

The dispersing element 104 is typically a diffraction grating which changes a reflection angle depending on the wavelength of incident light. The diffraction grating 104 in a spectrum measuring device may also include a rotation mechanism which allows the diffraction grating 104 rotate within a predetermined angle under the control of an outside control means. By changing the angle of the diffraction grating 104, desired wavelength components are reflected toward the light axis of the convergence mirror 105.

The convergence mirror 105 is a concave mirror which receives light beams dispersed by the diffraction grating 104 as noted above. The convergence mirror 105 converges the light beams and focuses them at the slit 107.

The slit 107 blocks undesired wavelength components and allows the light beams of desired wavelength range pass therethrough to reach the photodetector 106.

The photodetector 106 receives the light beams coming through the slit 107 and convert the intensity of the light beams into an electric signal corresponding to the intensity of the light beams.

As has been described in the foregoing, in order to effectively eliminate the polarization dependency of the dispersing element, the angle of the double-image elements 101 and 102 have to be precisely fixed so that the polarized light beams perpendicularly intersecting each other from the double-image elements always maintain 45 degrees with respect to a direction of grooves in the rotating diffraction grating 104. IF these angles of the double-image element with respect to the other optical components are not precisely aligned, a measurement error will be produced, which hampers the elimination of the polarization dependency.

SUMMARY OF THE INVENTION

Therefore, it is an object of the present invention to provide an optical spectrum measuring device which is capable of improving the measurement stability and accuracy by removing a polarization dependency in a dispersing element in the spectrum measuring device.

It is another object of the present invention to provide spectrum measuring device which is capable of minimizing the polarization dependency of a diffraction grating in the spectrum measuring device so as to maintain a constant diffraction efficiency.

It is a further object of the present invention to provide an optical system which is capable of eliminating the limitations involving the positional arrangement between the optical components in an optical system.

It is a further object of the present invention to provide an optical system which is capable of eliminating the precise positional requirements associated with double-image polarization elements and the dispersing element so that the spectrum measurement with high accuracy is accomplished without requiring the precise alignment of the double-image elements and the dispersing element.

According to the present invention, a spectrum measuring device for measuring optical spectrum of input light includes first and second double-image elements which separate input light to be measured into two polarized wave components having respective planes of polarization perpendicularly intersecting each other and having different optical axes, a third double-image element which separates the two polarized wave components from the first and second double-image elements into four polarized wave components each two of which having respective planes of polarization perpendicularly intersecting each other and having different optical axes, a dispersing element which is irradiated by the four polarized wave components from the third double-image element in which the dispersing element separates optical components of each wavelength contained in the four polarized wave components at the same angle of separation, and a photodetector for measuring an overall intensity of the four polarized wave components of the same wavelength separated by the dispersing element.

In this arrangement of the present invention, the overall intensity W of the four polarized wave components of the same wavelength detected by the photodetector is independent of an angle θ between the double-image elements and the dispersing element.

The reason is, as will be explained later with reference to equation (19), when diffraction efficiency of X axis of polarized light optical factor is assigned η and diffraction efficiency is assigned "ξ", the equation is:

$$W = \frac{\eta^2}{2} + \frac{\xi^2}{2}$$

hence the overall intensity is constant.

Namely, by arranging the third double-image element 103 which is turned by 45 degrees with respect to the second double-image element 102, two polarized beams from the second double-image element 102 are further separated into two, i.e., four light beams each two beams of which are orthogonal in polarization and have the same intensity. In this arrangement having the third double-image element, the overall intensity of the four beams detected by the photodetector is independent from the angle θ between the double-image elements and the dispersing element 104. Therefore, the present invention allows arbitrary optical positioning among the optical components in the spectrum measuring device, and thus the spectrum measurement by this arrangement is not dependent upon the diffraction efficiency of the dispersing element.

As a result, in the present invention, not only the elimination of the polarization dependency but also the elimination of the precise positional arrangement between the optical components, such as the conventional requirement of positioning the double-image element in an angle 45 degree with respect to the direction of the grooves in the diffraction grating, are accomplished.

Furthermore, since the precise positioning of the optical components is no longer required in the present invention, mass production of optical systems such as spectrum measuring devices is realized. Also, the spectrum measuring device of the present invention is not affected by factors such as optical or mechanical variations, and can maintain the measurement quality with high stability for a long period of time.

BRIEF DESCRIPTION OF THE DRAWINGS

FIGS. 3(a)–3(e) are schematic views for showing an operation of the double-image elements of the present invention.

FIGS. 6(a)–6(d) are schematic views for showing an operation of the double-image elements of the conventional spectrum measuring device of FIG. 4.

DETAILED DESCRIPTION OF THE PREFERRED EMBODIMENT

An embodiment of the present invention will be explained with reference to FIGS. 1–3 wherein an optical spectrum measuring device includes three double-image elements which receive a light signal having unknown polarization conditions to obtain optical spectrum of the light signal without being subject to the polarization conditions.

Figure 1:
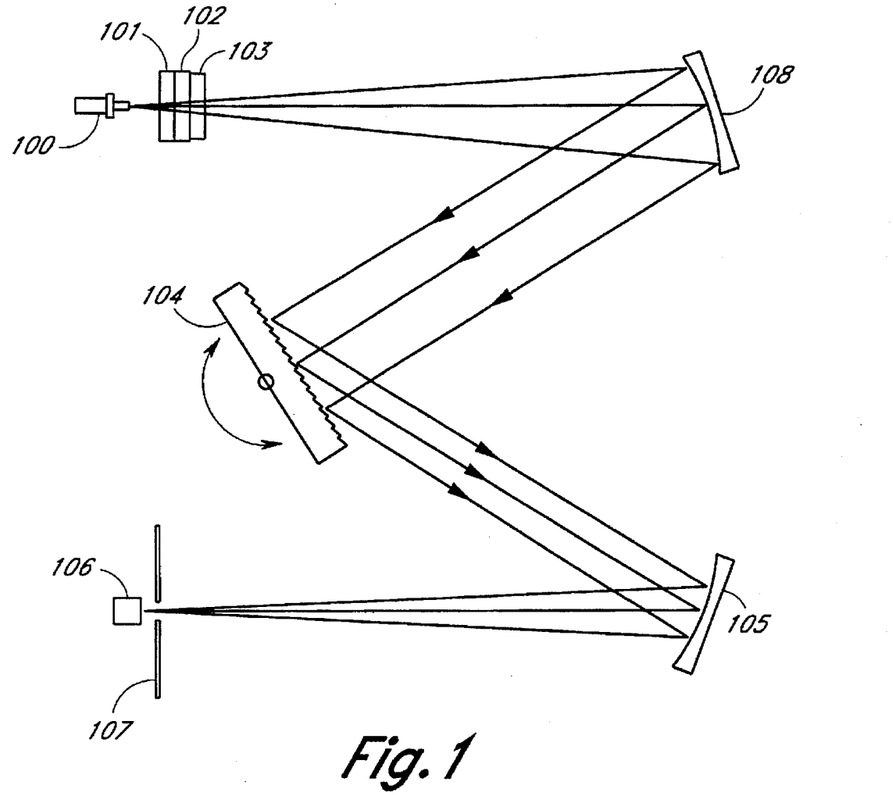
FIG. 1 shows a structure of a spectrum measuring device having three double-image elements in accordance with the present invention.

As shown in FIG. 1, the spectrum measuring device of the present invention includes an optical connecter 100, double-image elements 101 and 102, a double-image element 103, a collimate mirror 108, a dispersing element 104 such as a diffraction grating, a convergence mirror 105, a slit 107 and a photodetector 106. The structural difference from the conventional spectrum measuring device of FIG. 4 is that the spectrum measuring device of FIG. 1 additionally includes a third double-image element 103.

As in the conventional device, the double-image elements 101 and 102 separate the light to be measured into two polarized wave components having different optical axes and the planes of polarization of which are perpendicular with each other. Because of this function in the double-image elements 101 and 102, the polarization dependency of the dispersing element 104 such as a diffraction grating is removed. However, the double-image elements 101 and 102 and the diffraction grating 104 have to be precisely arranged in terms of optical positioning for effectively removing the polarization dependency. This invention is to eliminate the polarization dependency even when the positional relationship among the optical components, for example, between the double-image elements 101 and 102 and the diffraction grating 104 is deviated from the ideal position. The invention is particularly useful in mass production of the spectrum measuring device since the precise positional alignment is not required.

Arrangement of the double-image elements 101, 102 and 103 and their optical effects are described below. The first and second double-image elements 101 and 102 are positioned in the same way as in the conventional spectrum measuring device of FIG. 4. The third double-image element 103 is, like the double-image elements 101 and 102 in FIG. 5, a flat plate made of a uniaxial crystal material such as calcite and is cut obliquely to the crystal axis direction in such a way that an extraordinary ray will be refracted in a Z-direction. Thus, the double-image element has a function of separating the incident light into two beams having different optical axes, as well as the function of splitting the light into two polarized wave components.

Figure 2:
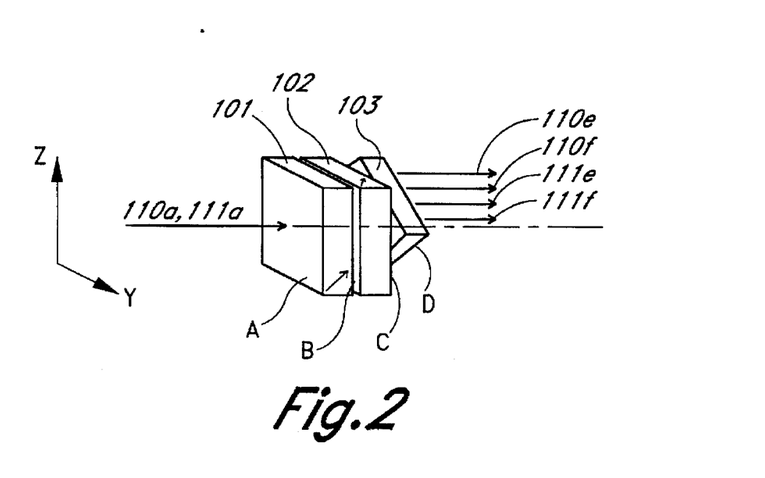
FIG. 2 is a schematic view showing a positional relationship between the three double-image elements of the present invention.

The third double-image element 103 is arranged so that it is 45 degrees rotated with respect to the second double-image element 102 as shown in FIG. 2 as shown in FIG. 2. The double-image element 103 receives two light beams polarized orthogonally with each other from the double-image element 102 at 45 degree angle turned from the element 102. The double-image element 103 produces four beams of light by separating the incident light beams, which will be explained in more detail later.

As shown in FIG. 2, it is assumed that the light to be measured from the optical connector 100 has two orthogonally polarized wave components 110a and 111a. The light to be measured is projected perpendicularly toward a surface A of the first double-image element 101 and then to a surface B of the second double-image element 102. The light beams from the second double-image element 102 incident to a surface C of the third double-image element 103. After passing all the double-image elements 101–103, four polarized wave components 110e, 110f, 111e, 111f are emitted from a surface D of the third double-image element 103.

FIG. 3 shows the operation of the double-image elements 101–103. As shown in FIG. 3(a), in the double-image element 101, an extraordinary ray is refracted to the Z-direction so that the polarized wave component 110a is vertically displaced while the polarized wave component 111a advances directly. Thus, as shown in FIG. 3(b), a polarized wave component 110b which is originated from the wave component 110a and a polarized wave component 111b which is originated from the component 111a are projected to the surface B of the double-image element 102.

Figure 3A:
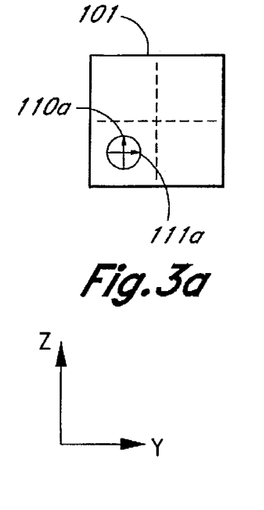
FIG. 3(a) is an optical diagram showing orthogonal polarization components in the light projected to a surface A of the double-image element 101.
Figure 3B:
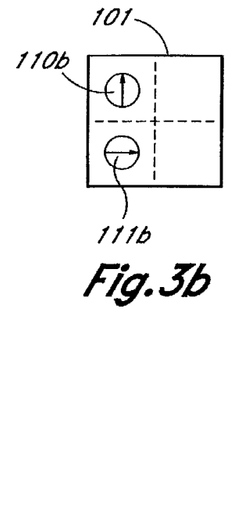
FIG. 3(b) is an optical diagram showing the polarization components incident to the double-image element 102.
Figure 3C:
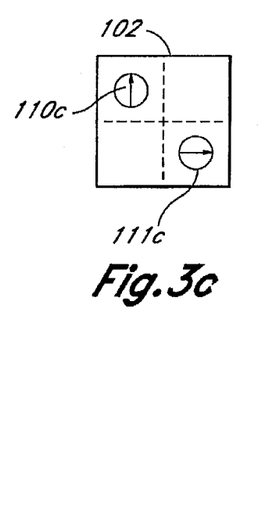
FIG. 3(c) is an optical diagram showing the polarization components emitted from the double-image element 102.

In the double-image element 102, the polarization component 110b advances directly while an extraordinary ray is refracted to the Y-direction so that the polarization component 111b is laterally displaced. Thus, as shown in FIG. 3(c), a polarized wave component 110c which is originated from the component 110b and a polarization component 111c which is originated from the component 111b are emitted from the surface C of the double-image element 102. Traveling distances for these wave components in the double-image elements 101 and 102 are identical since the double-image elements 101 and 102 are made of parallel surfaces having the same thickness.

Figure 3D:
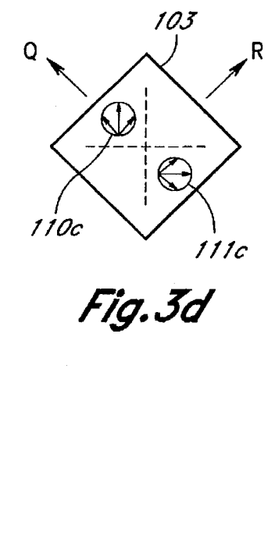
FIG. 3(d) is an optical diagram showing the polarization components incident to the double-image element 103.
Figure 3E:
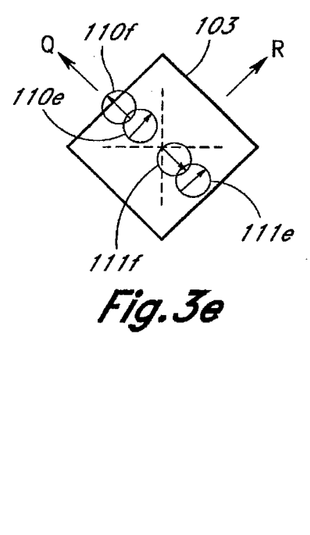
FIG. 3(e) is an optical diagram showing polarization components emitted from the double-image element 103.

The projected wave components to the third double-image element 103 are in the positions shown in FIG. 3(d). Namely, the polarized wave components 110c and 111c incident to the third double-image element 103 in the angle 45 degrees. If the direction of an extraordinary light of the third double-image element 103 is assigned Q and its perpendicularly crossing direction is assigned R, a polarized wave component in the Q direction separates and displaces toward the Q direction. As a result, as shown in FIG. 3(e), the polarized wave component 110c incident to the third double-image element 103 is emitted therefrom in two components, a polarized wave component 110f which is displaced in the Q direction and a polarized wave component 110e which is directly advanced in the R direction. Similarly, the polarized wave component 111c incident to the third double-image element 103 is emitted therefrom in two components, a polarized wave component 111f which is displaced in the Q direction and a polarized wave component 111e which is directly advanced in the R direction. These four light beams which are separated one another project in parallel in separate axes in the Q direction.

By providing the third double-image element, the present invention obviates the needs of precisely aligning the directional angle "θ" between the diffraction grating 104 and the double-image elements 101–103. This effect is explained in more detail with reference to mathematical expressions as follows.

Completely polarized monochromatic light is expressed as equation (1) where Ex is an amplitude in a X direction and is and Ey is an amplitude in Y direction. This matrix vector is called Jones vector.

$$\psi = \begin{bmatrix} Ex \\ Ey \end{bmatrix} e^{i(wt-\phi)} \quad (1)$$

When the light beam expressed as equation (1) passes through an optical polarization element such as a crystalline plate (double-image element), its amplitude and phase are changed. This phenomena is expressed by a matrix of equation (2) where P(θ) is a polarized component in an angle θ.

$$P(\theta) = \begin{bmatrix} \cos^2\theta & \cos\theta\sin\theta \\ \sin\theta\cos\theta & \sin^2\theta \end{bmatrix} \quad (2)$$

When a diffraction efficiency in the X direction is ζ, and a diffraction efficiency in the Y direction is η, a diffraction grating G in a direction O is expressed as matrix of equation (3).

$$G = \begin{bmatrix} \eta & O \\ O & \xi \end{bmatrix} \quad (3)$$

The polarized component P(θ) in the angle θ and amplitudes of input and output lights for the diffraction grating G are expressed by equations (4)–(6) where equation (5) is directed to the input light and equation (6) is directed to the output light.

$$E = GP(\theta)E \quad (4)$$

$$E = \begin{bmatrix} E\eta \\ E\xi \end{bmatrix} \quad (5)$$

$$E' = \begin{bmatrix} E'\eta \\ E'\xi \end{bmatrix} \quad (6)$$

An optical intensity is expressed as equation (7) where a mark * denotes complex conjugate.

$$W = EE^* = ExE^*x + EyE^*y \quad (7)$$

Here, it is considered an effect of eliminating the polarization dependency by two double-image elements, i.e., crystalline plates typically Sayart plates which displace polarized wave components without causing a phase shift in the wave components.

When an input light having an amplitude E passes through the Sayart plates, it is separated into two beams having polarization angles ±45 degrees with respect to a groove of the diffraction plate. The two beams are then emitted from the diffraction grating each of which is expressed as equations (8) and (9). By using equation (2), the polarized component is expressed as equation (10).

$$E1 = GP(45°) E \quad (8)$$

$$E2 = GP(-45°) E \quad (9)$$

$$P(45°) = \begin{bmatrix} 1/2 & 1/2 \\ 1/2 & 1/2 \end{bmatrix} \quad (10)$$

$$P(-45°) = \begin{bmatrix} 1/2 & -1/2 \\ -1/2 & 1/2 \end{bmatrix}$$

When an input light is a linear polarized light of angle α having a unity of amplitude, the amplitude E is expressed as equation (11).

$$E1 = \begin{bmatrix} \eta & O \\ O & \xi \end{bmatrix} \begin{bmatrix} 1/2 & 1/2 \\ 1/2 & 1/2 \end{bmatrix} \begin{bmatrix} \cos\alpha \\ \sin\alpha \end{bmatrix} \quad (11)$$

$$= \begin{bmatrix} (\eta/2)(\cos\alpha + \sin\alpha) \\ (\xi/2)(\cos\alpha + \sin\alpha) \end{bmatrix}$$

By applying equation (11) to equations (8) and (9), equations 12 and 13 are given as follows:

$$E1 = \begin{bmatrix} \cos\alpha \\ \sin\alpha \end{bmatrix} \quad (12)$$

$$E1 = \begin{bmatrix} \eta & O \\ O & \xi \end{bmatrix} \begin{bmatrix} 1/2 & -1/2 \\ -1/2 & 1/2 \end{bmatrix} \begin{bmatrix} \cos\alpha \\ \sin\alpha \end{bmatrix} \quad (13)$$

$$= \begin{bmatrix} (\eta/2)(\cos\alpha - \sin\alpha) \\ (\xi/2)(-\cos\alpha + \sin\alpha) \end{bmatrix}$$

An overall intensity W of the two light beams received by the photodetector at the same time is expressed as equation (14) which is constant without regard to the polarization angle a of the input light.

$$W = E1E^+1 + E2E^+2 = \quad (14)$$
$$\{(\eta/2)(\cos\alpha + \sin\alpha)\}^2 + \{(\xi/2)(\cos\alpha + \sin\alpha)\}^2 +$$
$$\{(\eta/2)(\cos\alpha - \sin\alpha)\}^2 + \{(\xi/2)(-\cos\alpha + \sin\alpha)\}^2 =$$
$$(\eta SUP2/4)(1 + 2\cos\alpha\sin\alpha + 1 - 2\cos\alpha\sin\alpha) +$$
$$(\xi^2/4)(1 + 2\cos\alpha\sin\alpha + 1 - 2\cos\alpha\sin\alpha) =$$
$$\eta^2/2 + \xi^2/2$$

In the following, it is considered an effect of eliminating the polarization dependency in a case where three double-image elements (crystalline plates) are incorporated. As noted above, since the intensity detected by the photodetector is not dependent upon the polarization angle $\alpha$ in the case of using the two crystalline plates, when an angle of the three crystalline plates is $\theta$, four light beams split by the three crystalline plates are emitted by the diffraction grating and expressed as equation (15).

$$E1 = GP(\theta+45°)P(\theta)E$$
$$E2 = GP(\theta-45°)P(\theta)E$$
$$E3 = GP(\theta+45°)P(\theta+90°)E$$
$$E4 = GP(\theta-45°)P(\theta+90°)E \quad (15)$$

By using equation (2), polarized wave components are expressed as equation (16).

$$E1 = 1/4G \begin{bmatrix} B+1 & A-1 \\ A+1 & -B+1 \end{bmatrix} E \quad (16)$$

$$E2 = 1/4G \begin{bmatrix} A+1 & B+1 \\ B-1 & -A+1 \end{bmatrix} E$$

$$E3 = 1/4G \begin{bmatrix} -A+1 & B+1 \\ B-1 & A+1 \end{bmatrix} E$$

$$E4 = 1/4G \begin{bmatrix} -B+1 & -A-1 \\ -A+1 & B+1 \end{bmatrix} E$$

From equations (15) and (16), and by using the relationship, $A=\cos2\theta+\sin2\theta$, $B=\cos2\theta-\sin2\theta$, equations (17) and (18) are given as follows:

$$P(\theta+45°) = 1/2 \begin{bmatrix} 1-\sin2\theta & \cos2\theta \\ \cos2\theta & 1+\sin2\theta \end{bmatrix} \quad (17)$$

$$P(\theta) = 1/2 \begin{bmatrix} 1-\cos2\theta & \sin2\theta \\ \sin2\theta & 1-\cos2\theta \end{bmatrix}$$

$$P(\theta-45°) = 1/2 \begin{bmatrix} 1-\sin2\theta & -\cos2\theta \\ -\cos2\theta & 1-\sin2\theta \end{bmatrix}$$

$$P(\theta+90°) = 1/2 \begin{bmatrix} 1-\cos2\theta & -\sin2\theta \\ -\sin2\theta & 1+\cos2\theta \end{bmatrix}$$

Based on equations (17) and (18), an overall intensity for four light beams detected by the photodetector is obtained as equation (19).

$$E1 = \begin{bmatrix} (\eta/4)(B\cos\alpha + \cos\alpha + A\sin\alpha - \sin\alpha) \\ (\zeta/4)(A\cos\alpha + \cos\alpha - B\sin\alpha + \sin\alpha) \end{bmatrix} \quad (18)$$

$$E2 = \begin{bmatrix} (\eta/4)(A\cos\alpha + \cos\alpha + B\sin\alpha + \sin\alpha) \\ (\zeta/4)(-B\cos\alpha - \cos\alpha - A\sin\alpha + \sin\alpha) \end{bmatrix}$$

$$E3 = \begin{bmatrix} (\eta/4)(-A\cos\alpha + \cos\alpha + B\sin\alpha + \sin\alpha) \\ (\zeta/4)(B\cos\alpha - \cos\alpha + A\sin\alpha + \sin\alpha) \end{bmatrix}$$

$$E4 = \begin{bmatrix} (\eta/4)(-B\cos\alpha + \cos\alpha - A\sin\alpha - \sin\alpha) \\ (\zeta/4)(-A\cos\alpha + \cos\alpha + B\sin\alpha + \sin\alpha) \end{bmatrix}$$

$$W = E1E^*1 + E2E^*2 + E3E^*3 + E4E^*4 \quad (19)$$
$$= \eta^2/2 + \zeta^2/2$$

This equation does not include the angle $\theta$. Hence, it is deduced that the overall intensity is constant without depending on the angle $\theta$ of the three crystalline plates or the polarization angle $\alpha$ of the input light. This shows that for the three crystalline structure having the third double-image element 103, as opposed to the conventional two crystalline structure having two double-image elements, the dependency factor of angle $\theta$ between the double-image elements and the diffraction grating can be ignored.

In the foregoing for a preferred embodiment, the mathematical basis is explained to eliminate the polarization dependency in case where an optical angular or positional relationship between the double-image elements 101–103 and the dispersing element such as the diffraction grating 104 is deteriorated. However, the same explanation is also applicable to an optical angular or positional relationship between other optical components of the optical spectrum measuring device so long as the measuring device includes a double-image element as a means for eliminating the polarization dependency.

Although the third double-image element 103 is disposed after the second double-image element 102 in the above embodiment, the position of the third double-image element 103 is not limited to this example. For example, the same inventive effect is also available in case where the third double-image element 103 is positioned before the first double-image element 101 or between the first and second double-image elements 101 and 102. Further, the arrangement order of the first and second double-image element can be altered with the same inventive effect.

Since the present invention is comprised as explained as above, the following advantages are obtained:

By arranging the third double-image element 103 which is turned by 45 degrees with respect to the second double-image element 102, two polarized beams from the second double-image element 102 are further separated into two, i.e., four light beams each two beams of which are orthogonal in polarization and have the same intensity. In this arrangement having the third double-image element, the overall intensity of the four beams detected by the photodetector is independent from the angle $\theta$ between the double-image elements and the dispersing element 104. Therefore, the present invention allows arbitrary optical positioning between these optical components and thus the spectrum measurement by this arrangement is not dependent upon the diffraction efficiency of the dispersing element 104.

As a result, in the present invention, not only the elimination of the polarization dependency but also the elimination of the precise positional arrangement between the optical components, such as the conventional requirement of positioning the double-image element in an angle 45 degree with respect to the direction of the grooves in the diffraction grating 104, are accomplished.

Furthermore, since the precise positioning of the optical components is no longer required in the present invention, mass production of optical systems such as spectrum measuring devices is realized. Also, the spectrum measuring device of the present invention is not affected by factors such as optical or mechanical variations, and can maintain the measurement quality with high stability for a long period of time.

What is claimed is:

1. A spectrum measuring device for measuring optical spectrums of input light, comprising:

first and second double-image elements which separate input light to be measured into two polarized wave components having respective planes of polarization perpendicularly intersecting each other and having different optical axes;

a third double-image element which separates said two polarized wave components from said first and second double-image elements into four polarized wave components each two of which having respective planes of polarization perpendicularly intersecting each other and having different optical axes, said third double-image element being arranged in parallel with said first and second double-image elements with 45 degrees rotated with respect to an optical axis of said first and second double-image elements;

a dispersing element which is irradiated by said four polarized wave components from said third double-image element, said dispersing element separating optical components of each wavelength contained in said four polarized wave components at the same angle of separation; and a photodetector for measuring an overall intensity of the four polarized wave components of the same wavelength separated by said dispersing element.

2. A spectrum measuring device as defined in claim 1, wherein said dispersing element is a diffraction grating.

3. A spectrum measuring device as defined in claim 1, wherein each of said first, second and third double-image elements is a Savart plate.

4. A spectrum measuring device as defined in claim 1 further comprising a collimator mirror for rendering said four polarized wave components emitted from said third double-image elements into respective parallel beams for incidence to said dispersing element.

5. A spectrum measuring device as defined in claim 1 further comprising a convergence mirror which is irradiated by light waves separated by said dispersing element for converging the separated light waves onto said photodetector.

6. A spectrum measuring device as defined in claim 1 further comprising a slit which is irradiated with separated light of said four polarized wave component, said slit being positioned in close proximity with said photodetector.

7. A polarization eliminating device, comprising:

first and second double-image elements which separate input light into two polarized wave components having respective planes of polarization perpendicularly intersecting each other and having different optical axes;

a third double-image element which separates said two polarized wave components from said first and second double-image elements into four polarized wave components each two of which having respective planes of polarization perpendicularly intersecting each other and having different optical axes;

a dispersing element which is irradiated by said four polarized wave components from said third double-image element, said dispersing element separating optical components of each wavelength contained in said four polarized wave components at the same angle of separation; and a photodetector for measuring an overall intensity of the four polarized wave components of the same wavelength separated by said dispersing element.

* * * * *